United States Patent
Lacy et al.

(10) Patent No.: US 12,361,295 B2
(45) Date of Patent: Jul. 15, 2025

(54) MACHINE LEARNING TO AUTOMATE REQUEST TAGGING FOR CONVERSION FUNNELS

(71) Applicant: Salesforce, Inc., San Francisco, CA (US)

(72) Inventors: Robert Lacy, Burlington, MA (US); Yael Aharon, Burlington, MA (US)

(73) Assignee: Salesforce, Inc., San Francisco, CA (US)

(*) Notice: Subject to any disclaimer, the term of this patent is extended or adjusted under 35 U.S.C. 154(b) by 1074 days.

(21) Appl. No.: 17/206,319

(22) Filed: Mar. 19, 2021

(65) Prior Publication Data
US 2022/0300827 A1    Sep. 22, 2022

(51) Int. Cl.
*G06N 5/01* (2023.01)
*G06F 16/955* (2019.01)
*G06F 40/30* (2020.01)
*G06F 40/55* (2020.01)

(52) U.S. Cl.
CPC ............ *G06N 5/01* (2023.01); *G06F 16/955* (2019.01); *G06F 40/30* (2020.01); *G06F 40/55* (2020.01)

(58) Field of Classification Search
None
See application file for complete search history.

(56) References Cited

U.S. PATENT DOCUMENTS

| | | | | |
|---|---|---|---|---|
| 8,291,016 | B1* | 10/2012 | Whitney | H04L 67/535 709/224 |
| 2008/0177600 | A1* | 7/2008 | McCarthy | G06Q 30/0204 705/7.33 |
| 2011/0231224 | A1* | 9/2011 | Winters | G06Q 30/06 705/7.29 |
| 2016/0342288 | A1* | 11/2016 | Konik | G06Q 30/0643 |
| 2018/0300748 | A1* | 10/2018 | Flaks | G06Q 30/0243 |

OTHER PUBLICATIONS

Lee et al.; A Comparison and Interpretation of Machine Learning Algorithm for the Prediction of Online Purchase Conversion; J. Theor. Appl. Electron. Commer. Res. 2021, 16, 1472-1491. https://doi.org/10.3390/jtaer16050083 (Year: 2021).*

* cited by examiner

*Primary Examiner* — Alan Chen
(74) *Attorney, Agent, or Firm* — Butzel Long

(57) ABSTRACT

Methods, computer readable media, and devices for machine learning for automated tagging of requests for e-commerce conversion funnel tracking. One method may include retrieving a plurality of requests previously grouped into a user session, generating preprocessed request information by determining a request type, a relative time, and a keyword count for each of the plurality of requests and determining a determining a relative time distribution for each of the plurality of keywords, and applying a machine learning model to the plurality of requests and the preprocessed request information to tag each of the plurality of requests as being associated with one of the plurality of conversion classifications.

20 Claims, 5 Drawing Sheets

MACHINE LEARNING TO AUTOMATE REQUEST TAGGING FOR CONVERSION FUNNELS

TECHNICAL FIELD

Embodiments disclosed herein relate to techniques and systems for machine learning for automated request tagging of user requests in order to classify those requests.

BACKGROUND

A conversion funnel relates to tracking a user through a website to determine whether the user "converts" to a buyer. In a traditional approach, each page and/or element within a website may be manually tagged as corresponding to one of four conversion categories. In turn, individual user requests for the various pages and/or elements may be evaluated in order to classify those requests and determine how to place users within a conversion funnel. However, such manual approach can be time consuming and error prone.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1A:
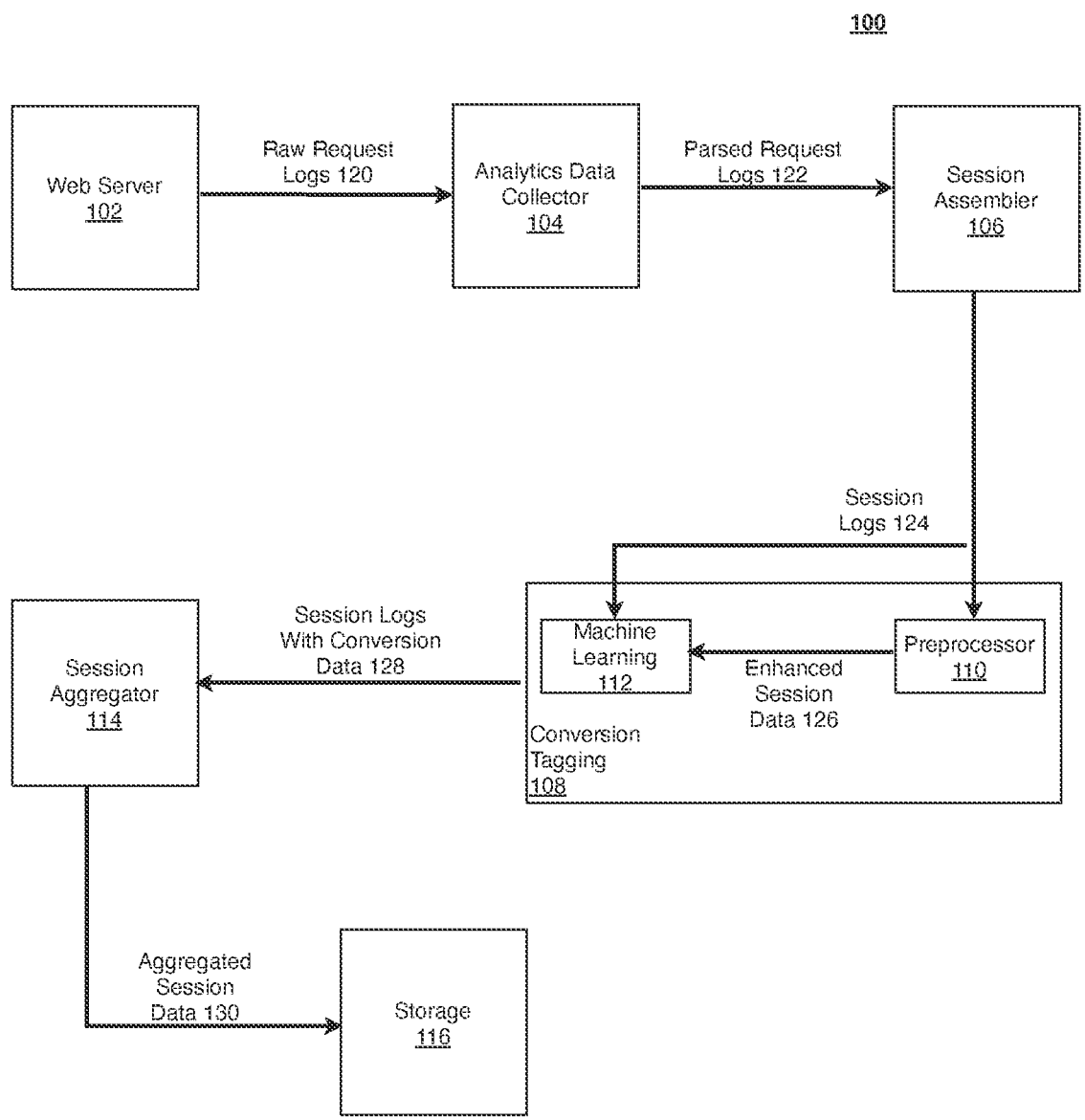
FIG. 1A is a block diagram illustrating a system for use with machine learning for automated request tagging according to some example implementations.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Web-based user interfaces and similar technologies often make use of user sessions that may include numerous requests from a client device to one or more servers and/or backend services. In some cases, it is beneficial to track a user's "journey" through a site or service, i.e., the specific order of pages visited, links selected, and the like, such as to better tailor the site and related services to the user's needs. However, such tracking may be difficult in large-scale, multi-user systems that may provide a framework for multiple sites due to the large number and type of requests, responses, and services available. Embodiments disclosed herein may provide machine learning-based approaches to more efficiently track user journeys across a wide variety of sites, pages, services, and the like, thereby improving the efficiency of the underlying hosting system as well as providing a more streamlined and pleasing user experience.

As an example, conversion funnels, and the metrics that support them, may be one of the more important parts of web analytics. In e-commerce, conversion funnels may measure a customer's journey from browsing to shopping cart and ultimately to placing an order. Each step of the funnel may represent a chance for a customer to exit the process. Accurate reporting may be able to help a vendor optimize their site, improve retention, and increase sales.

Due to the diversity of commerce websites, analytics vendors and e-commerce platforms may not be able to easily identify the actual steps of the conversion journey. In a traditional approach, each vendor may be required to manually tag the pages and/or other elements of the vendor's site to identify how those pages and/or other elements map to specific steps within a conversion funnel.

In various implementations of the disclosed subject matter, machine learning may be utilized to automatically classify e-commerce website requests into one of four conversion categories including: visit; cart; checkout; and order. The visit category may represent, for example, when a user visits a vendor's site. The cart category may represent, for example, when a user places a product/service into a shopping cart of the vendor's site (e.g., the user becomes a shopper). The checkout category may represent, for example, when a user initiates or continues a checkout process. The order category may represent, for example, when a user completes a purchase (e.g., a shopper becomes a buyer). This automatic classification of user requests may be incorporated into an analytics data processing architecture in order to add the classification and allow for conversion funnel metrics to be calculated. As previously noted, the automatic classification and resulting analytics also may provide benefits to the e-commerce websites themselves and/or an e-commerce system that hosts them.

In one example, a commerce site may offer a number of products for sale and the site may include a number of different pages and/or elements. For example, the site may include an initial "splash page" that welcomes shoppers, various product information pages that provide additional information about each product, a shopping cart functionality that allows a shopper to place a product into a "shopping cart", and a checkout functionality that enables a shopper to complete a purchase of product(s). In this example, the vendor operating the site would benefit from information describing how shoppers "move" through the site. For example, if a number of shoppers leave after the initial "splash page", the vendor may want to make changes to that page. Similarly, if shoppers leave after visiting a product information page, this may raise concerns about those pages. Or if a number of shoppers fail to complete the checkout process, this might be indicative of an issue with that process. Information about how shoppers "move" through the "funnel" of shopping on the site may help the vendor make improvements.

In a traditional approach, the vendor in this example may need to individually tag the various pages and/or elements as belonging to the various "stages" of the funnel. For example, the "splash page" and product information pages may be tagged as "visit", the cart functionality may be tagged as "cart", and the checkout functionality may be tagged as "checkout". These tags may then be associated with records generated by shopper visits (e.g., log entries). By analyzing these records with the associated tags, the vendor in this example may have a better understanding of how the commerce site is performing and where changes may need to be made. However, due to the dynamic nature of content, this manual tagging may be error prone. For example, one dynamically generated version of the splash page may be properly tagged while another version may not. Or one generated product information page may be mis-tagged as "cart" instead of visit.

In various implementations of the disclosed subject matter, the manual approach to tagging pages may be eliminated and machine learning may be utilized to identify the various records as belonging to the various stages of a funnel. For example, based on keywords within a record indicating a user visited a product information page as well as other enhanced information about a collection of records describing the user's other actions, the record may be identified as belonging to the "visit" stage and tagged accordingly. Similarly, when the user moves to checkout, a record indicating this action may be evaluated, identified as belonging to the "checkout" stage, and tagged accordingly. Such automated tagging of requests may enhance to ability to track a conversion funnel for a commerce site.

Implementations of the disclosed subject matter provide methods, computer readable media, and devices for machine learning for automated tagging of requests for e-commerce conversion funnel tracking. In various implementations, a method may include retrieving a plurality of requests previously grouped into a user session, generating preprocessed request information, and applying a machine learning model to the plurality of requests and the preprocessed request information to tag each of the plurality of requests as being associated with one of a plurality of conversion classifications. In some implementations, each request may include a uniform resource locator (URL), a timestamp, a request method, a referrer, and a session identifier and the user session may include a session start time, a session end time, and a session length. In some implementations, preprocessed request information may be generated by determining a request type for each of the plurality of requests, determining a relative time, relative to the session length, for each of the plurality of requests, determining, for each of the plurality of requests, a keyword count for each of a plurality of keywords, each of the plurality of keywords belonging to one or more keyword lists and each keyword list corresponding to one of the plurality of conversion classifications, and determining a relative time distribution, relative to the session length, for each of the plurality of keywords.

In various implementations, the plurality of requests may include requests made by a user to a website.

In various implementations, each request type may be one of a top-level page request or a child request.

In various implementations, each relative time may be one of early, middle, or late.

In various implementations, each relative time distribution may be one of early, middle, late, or uniform.

In various implementations, the machine learning model may include a decision tree or a random forest.

In various implementations, the method may further include creating, for the plurality of requests, a conversion funnel based on a tag of each of the plurality of requests.

In various implementations, the method may further include retrieving a second plurality of requests previously grouped into a second user session, generating second preprocessed request information by determining a request type for each of the second plurality of requests, determining a relative time for each of the second plurality of requests, determining, for each of the second plurality of requests, a keyword count for each of a second plurality of keywords, and determining a relative time distribution for each of the plurality of keywords, and applying the machine learning model to the second plurality of requests and the second preprocessed request information to tag each of the second plurality of requests as being associated with one of the plurality of conversion classifications.

FIG. 1A illustrates a system 100 for use with machine learning for automated request tagging. In various implementations, the system 100 may include, for example, web server 102, analytics data collector 104, session assembler 106, conversion tagging 108, session aggregator 114, and storage 116. In some implementations, conversion tagging 108 may include, for example, preprocessor 110 and machine learning 112.

In various implementations, web server 102 may generate, for example, raw request logs 120. For example, web server 102 may provide a platform for or otherwise provide access to a commerce site. Such commerce site may provide, for example, information about and/or the ability to purchase products and/or services offered by a vendor. As a visitor to the site accesses a page and/or element of the site, information about the access, referred to as a user request, may be stored in raw request logs 120. As such, raw request logs 120 may include, for example, information about various users and how those users accessed various pages and/or elements of the commerce site.

In various implementations, raw request logs 120 may be provided to or otherwise accessed by analytics data collector 104. Analytics data collector 104 may, for example, parse raw request logs 120 to extract various analytics data points regarding the various user requests within the logs. The parsed logs may be collected, for example, into parsed request logs 122.

In various implementations, parsed request logs 122 may be provided to or otherwise accessed by session assembler 106. Session assembler 104 may, for example, group various user requests into user sessions. At any given moment in time, any number of users may be accessing web server 102 and generating any number of user requests within raw request logs 120. However, each user request may be correlated or otherwise associated with a user. As a single user continues to visit or otherwise access other pages and/or elements of the commerce site, additional user requests for that user may be generated and collected in raw request logs 120. The user's visit may be referred to, for example, as a session and the user requests of that user may be grouped into a user session for that user by session assembler 104. The various user sessions (i.e., user requests grouped by user) may be collected in session logs 124.

In various implementations, session logs 124 may be provided to or otherwise accessed by preprocessor 110 and machine learning 112. Preprocessor 110 may, for example, process each user session to generate enhanced data about the user session. For example, preprocessor 110 may determine a request method for each request within the user session (e.g., GET, PUT, POST), a request type for each request (e.g., parent request, child request), a relative time for each request relative to the user session (e.g., early, late), a keyword count of various keywords, and a distribution of various keywords relative to the user session (e.g., early, middle, late, uniform). In some implementations, the various keywords may be organized into dictionaries. For example, a cart dictionary may include the keywords cart, basket, bag, add, and view; a checkout dictionary may include checkout, check, out, address, payment, card, shipping, and billing; and an order dictionary may include order, complete, receipt, confirmation, and details. This enhanced data for each user session may, for example, be collected in enhanced session data 126 and provided to machine learning 112.

In various implementations, machine learning 112 may utilize session logs 124 and enhanced session data 126 to classify each user request within a user session as belonging to one of a number of funnel classifications. In one example, funnel classifications may include visit, cart, checkout, and order. In this example, machine learning 112 may classify some number of user requests from one user session as belonging to the visit classification and some number from this one user session as belonging to the cart classification. Further in this example, some number of requests from a second user session may be classified as cart, some number as checkout, and some number as order. Thus, for each user session, there may be a different number of funnel classifications to which user requests are classified. The implication may be, for example, that one user only visited the commerce site, another user may have placed items into a cart and then abandoned or otherwise left the commerce site, and still another completed a purchase and is awaiting an order. Such classification of user requests within a user session may, for example, help a vendor or other operator of a commerce site to identify how well the site is performing based on how users are moving through the site. The various user requests and additional classification information may be collected or otherwise organized into session logs with conversion data 128.

In various implementations, session aggregator 114 may process session logs with conversion data 128 to generate aggregated session data 130. For example, session aggregator 114 may aggregate the various user sessions and associated classifications to generate data points for reports regarding how users access a commerce site. Aggregated session data 130 may, for example, be stored in storage 116.

Figure 1B:
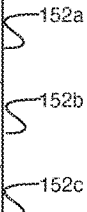
FIG. 1B illustrates various elements that may be part of various sample user requests according to some example implementations.

FIG. 1B illustrates a collection of user requests 140, such as may be part of raw requests logs 120 of FIG. 1A. User requests may include, for example, a number of fields such as path 142, referrer 144, timestamp 146, referrer timestamp 148, and method 150. However, user requests may include additional fields not shown. As shown in FIG. 1B, user request 152a may be a request for /product/1234. Such request may have been an initial request from a user because referrer 144 and referrer timestamp 148 are empty, indicating that this request was not referred by another page. However, user requests 152b, 152c may have been referred by /product/1234. That is, after the user visited /product/1234, the user subsequently visited another page (i.e., user request 152b) and placed a product in a cart (user request 152c).

Figure 1C:
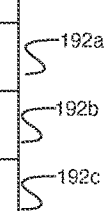
FIG. 1C illustrates various elements that may be party of various sample enhanced session data according to some example implementations.

FIG. 1C illustrates a collection of enhanced session data 160, such as may be part of enhanced session data 126 of FIG. 1A. Enhanced user data for user requests 192a, 192b, 192c may include, for example, path 162, type 164, method 166, time 168, early cart 170, late cart 172, uniform cart 174, early checkout 176, late checkout 178, uniform checkout 180, early order 182, late order 184, and uniform order 186. Path 162 may indicate, for example, a path to a page or resource being accessed, type 164 may indicate the type of request, method 166 may indicate a method of the request, and time 168 may indicate a relative time of the request in relation to the user session. The other fields may indicate a distribution of keywords relative to the user session. For example, user request 192b shows a 1 in early cart 170 indicating that 1 cart dictionary related keyword was identified early in the user session and a 1 in uniform cart 174 indicating that the 1 cart dictionary related keyword was identified uniformly during the session.

Figure 2A:
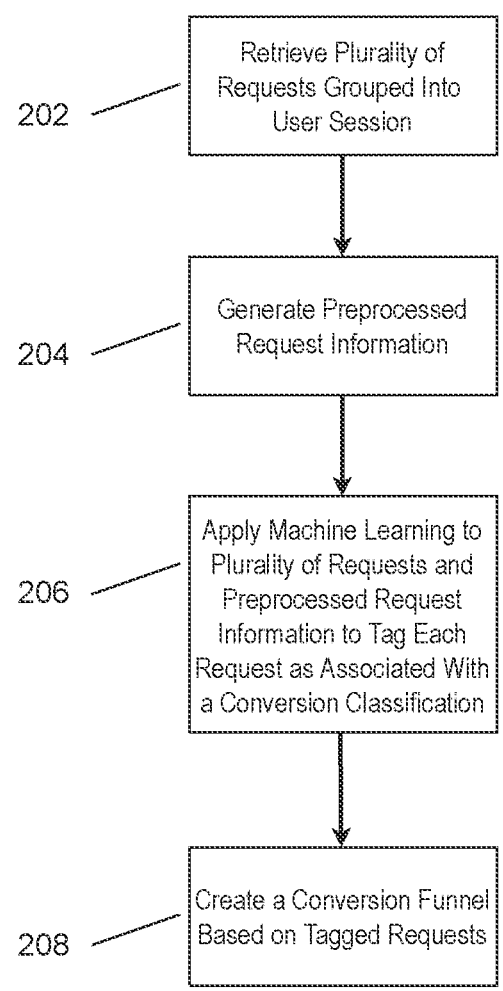
FIG. 2A is a flow diagram illustrating a method for machine learning for automated request tagging according to some example implementations.

FIG. 2A illustrates a method 200 for machine learning for automated request tagging, as disclosed herein. In various implementations, the steps of method 200 may be performed by a server, such as electronic device 300 of FIG. 3A or system 340 of FIG. 3B, and/or by software executing on a server or distributed computing platform. Although the steps of method 200 are presented in a particular order, this is only for simplicity.

In step 202, a plurality of user requests grouped into a user session may be retrieved. In various implementations, the plurality of user requests may represent, for example, a plurality of requests made by a user for pages and/or elements of a commerce site. For example, a shopper may visit a web store, request information about a product and/or service offered by the web store, select a product and/or service for purchase, and then complete the purchase. Each of these may generate one or more user requests representing the actions of the shopper.

Each user request may include, for example, a uniform resource locator (URL) of the page or element being requested, a timestamp of the request, a request method of the request, a referrer of the request, and a session identifier. In some embodiments, the session identifier may be an alphanumeric identifier used to identify multiple user requests from the same user during a session. A session may be defined, for example, as a period of time during which a user accesses a commerce site without a session timeout. A session timeout may be defined, for example, as a maximum amount of time after which, if no additional user requests are received, a session is terminated. For example, if a session timeout is set for 5 minutes, a user's session would include all requests made by the user until the user goes 5 minutes without a request. Any suitable or desired session timeout may be used, though typically it will be selected such that a user may have some flexibility to pause and subsequently resume interactions without starting a new session (e.g., a user may take some time to read a particular product information page, may need to physically move away from a computer, may need to interact with a different process on a computer, or the like). If a user returns to the site (i.e., requests a page and/or element) after the session timeout expires, a new session, and new session identifier, may be created for the user. In some embodiments, a user session may include, for example, a session start time, a session end time, and a session length. By grouping user requests together into a user session, a shopper's activities during a single visit may be identified and evaluated.

In step 204, preprocessed request information may be generated. For example, the plurality of requests in a user session may be processed to generate enhanced information about the requests. Such enhanced information may include, for example, a request type for each request, a relative time of the request in relation to the session length, a keyword count of various keywords contained within each request, and a relative time distribution of the various keywords in relation to the session length. A method for generating such enhanced information is discussed in further detail below in relation to FIG. 2B.

In step 206, machine learning may be applied to the plurality of requests and the enhanced information in order to tag each request as being associated with a conversion classification. In various implementations, a conversion funnel for a commerce site may include a plurality of stages where each stage represents a current relationship between a shopper and the commerce site. In some implementations, a conversion funnel may include four stages. For example, a conversion funnel may include a visit stage which represents that a shopper is visiting the site, a cart stage which represents that the shopper has placed a product or service into a "shopping cart" of the site, a checkout stage which represents that the shopper has begun (but not necessarily finished) a checkout process of the site, and an order stage which represents that the shopper has completed a purchase from the site. Although this example reflects a shopper that has moved through all four stages of the conversion funnel, this is only one example for simplicity. Different shoppers may move through fewer stages and not all shoppers may start at the same stage. For example, a first shopper may be a returning shopper who already had product(s)/service(s) in a cart and, for their current user session, would be considered in the cart stage, a second shopper may have visited the site and then left without placing any items in a cart which would place the second shopper in the visit stage for that user session, and a third shopper may have visited the site, placed product(s)/service(s) in a cart, and then left which would place the third shopper in the cart stage. Further in this example, the user session of the third shopper may have occurred before the user session of the first shopper and the third shopper and first shopper may actually represent the same shopper. Although the examples provided herein refer to "shoppers" for ease of understanding, similar approaches may be used for any journey through a site to provide improvements to the associated user journeys and backend hosting systems.

In various implementations, the machine learning may take into account the enhanced information to provide greater context for each user request. For example, relative time of a user request (early, mid, late) in relation to a session length may contribute to classifying a request as belonging to a different stage of the funnel. Similarly, a count of keywords within a request and a distribution of keywords relative to the session length may also contribute to a different classification. For example, various keywords may be grouped into keyword dictionaries with each keyword dictionary associated with a different stage (e.g., a cart keyword dictionary, a checkout keyword dictionary, and an order keyword dictionary) and each keyword dictionary may also be subdivided based on a time relative to the session length (e.g., early, mid, late, uniform). In addition, a request type, such as whether the requested page or element is a parent or child, may also contribute to classifying a request as belonging to a particular stage. In some implementations, the machine learning may include a decision tree or a random forest. As a result of this step, each user request within the user session will be tagged or otherwise associated with one stage of a conversion funnel.

In step 208, a conversion funnel may be created for the user based on the tagged requests. For example, if the user session only includes user requests tagged as a visit stage, the shopper may be placed within a visit stage of a conversion funnel created for that shopper. Similarly, if the user session includes user requests tagged as associated with various stages including an order stage, the shopper may be placed within an order stage of the conversion funnel.

While method 200 is described in relation to a single user session, this is only for simplicity. Method 200 may be repeatedly performed for a number of user sessions and, as a result, conversion funnels for a number of users may be created. In this way, a vendor or other operator of a commerce site may develop greater insight into how shoppers are interacting with the site. By automating the request tagging process, the vendor or other operator may reduce errors that may be introduced in a manual process due to the dynamic nature of content for the site. For example, the commerce site may utilize dynamically generated content that may be missed or otherwise not considered during a manual process, but such automated process as described herein would not.

Figure 2B:
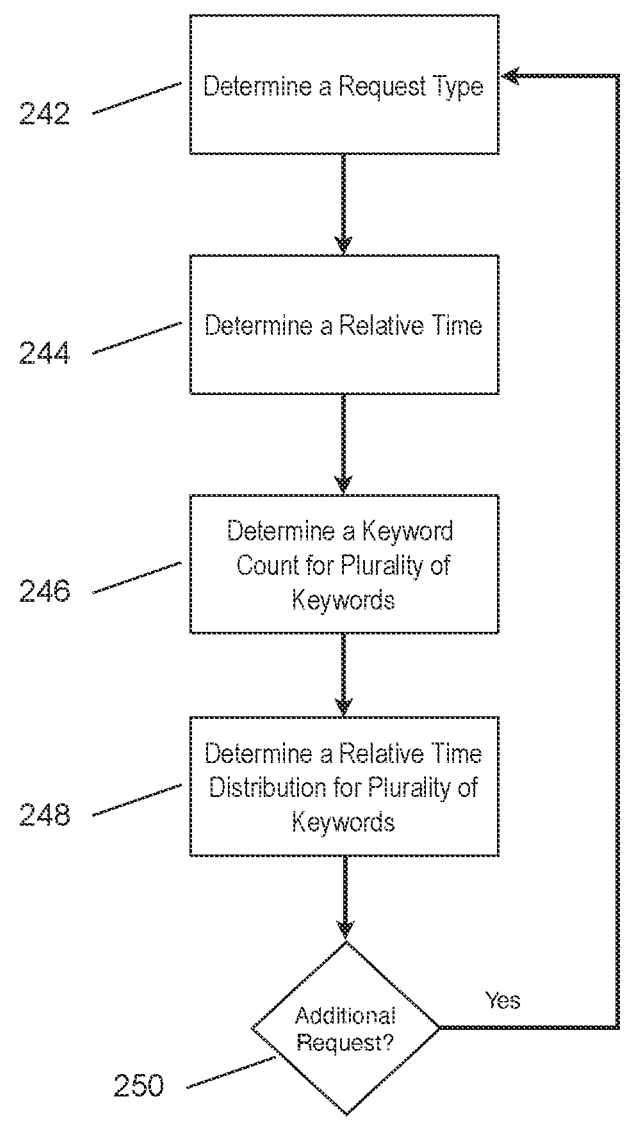
FIG. 2B is a flow diagram illustrating a method for preprocessing request information according to some example implementations.

FIG. 2B illustrates a method 240 for preprocessing request information, as disclosed herein. In various implementations, the steps of method 240 may be performed by a server, such as electronic device 300 of FIG. 3A or system 340 of FIG. 3B, and/or by software executing on a server or distributed computing platform. Although the steps of method 240 are presented in a particular order, this is only for simplicity.

In step 242, a request type may be determined for a user request. Such request type may be, for example, a parent type or a child type. A parent type may be a request for a parent or top-level page or element. Such parent or top-level page may be, for example, an initial "splash" or "welcome" page of a site. A child type may be a request for a child or internal page or element. Such child or internal page may be, for example, a subsequent page within the site such as a product information page or a checkout page. In various implementations, a request type may be determined, for example, based on a referrer attribute, a timestamp, and a method. For example, a parent page may always be a referrer to a child page, a child request may typically occur soon after a parent request, and a POST or PUT may not typically be a child request.

In step 244, a relative time may be determined for the user request. Such relative time may be determined, for example, based on a timestamp attribute of the user request and the relation of the timestamp to a session length. For example, a user request with a timestamp early within a session may have a early relative time while a user request with a timestamp late within the session may have a late relative time. In some implementations, the relative time may be one of early, middle, or late.

In step 246, a keyword count for a plurality of keywords may be determined for the user request. In various implementations, a number of keyword dictionaries each with a number of keywords may be identified. Each keyword dictionary may be associated with a different stage of a conversion funnel. For example, the keyword dictionaries may include a cart dictionary, a checkout dictionary, and an order dictionary. The cart dictionary may include, for example, cart, basket, bag, add, view, and the like. The checkout dictionary may include, for example, checkout, check, out, address, payment, card, shipping, billing, and the like. The order dictionary may include, for example, order, complete, receipt, confirmation, details, and the like. In some implementations, there may also be a visit dictionary, but such visit dictionary may not include any predetermined words and instead contain keywords and counts for words not otherwise contained in the other dictionaries. As one example of this step, the user request "https://www.example-site.com/cart/add?pid=123" may be determined to have a cart keyword count of 1 and an add keyword count of 1. Since both cart and add are keywords included in the cart dictionary, these keyword counts may contribute to a correlation of the user request being associated with a cart stage of a funnel.

In step 248, a relative time distribution for the plurality of keywords may be determined. In various implementations, each keyword dictionary may also be grouped into subgroups based on a timing relative to the session length. For example, the cart dictionary may be grouped into early cart keywords that tend to occur early within a session, late cart keywords that tend to occur late within the session, and uniform cart keywords that tend to occur uniformly within the session. Similarly, the checkout dictionary and order dictionary may, for example, be grouped into early, late, and uniform keywords. Referencing the user request from step 246, the keyword cart may be identified as occurring uniformly throughout a session while the keyword add may be identified as occurring late within a session. Thus, for this example request, a relative time distribution may be determined such that early cart keywords and uniform cart keywords have a value of 1 while other keyword subgroups have a value of 0. Such relative time distribution is also shown for request 192*b* of FIG. 1C.

In determination step 250, whether there is an additional user request within the user session may be determined. If there is an additional user request (i.e., determination step 250="Yes"), then the method would return to step 242 and the additional user request would also be processed. If there is no additional user request (i.e., determination step 250="No"), the method may end.

In this way, enhanced information about user requests within a user session may be determined. Such enhanced information, in conjunction with the user requests, may then be evaluated to determine how to tag individual user requests within the user session.

As discussed above, embodiments disclosed herein may improve the process of creating conversion funnels by automating tagging of user requests using machine learning. For example, by evaluating user requests that have already been generated, such process may reduce or eliminate the manual errors associated with dynamically generated content for a commerce site. The various issues addressed by the embodiments disclosed herein arise due to the increasing use of dynamically generated content within commerce sites as well as an increased frequency in changes to content within the site. The disclosed subject matter solves these issues by providing a mechanism to automate request tagging for commerce conversion funnel tracking.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 3A:
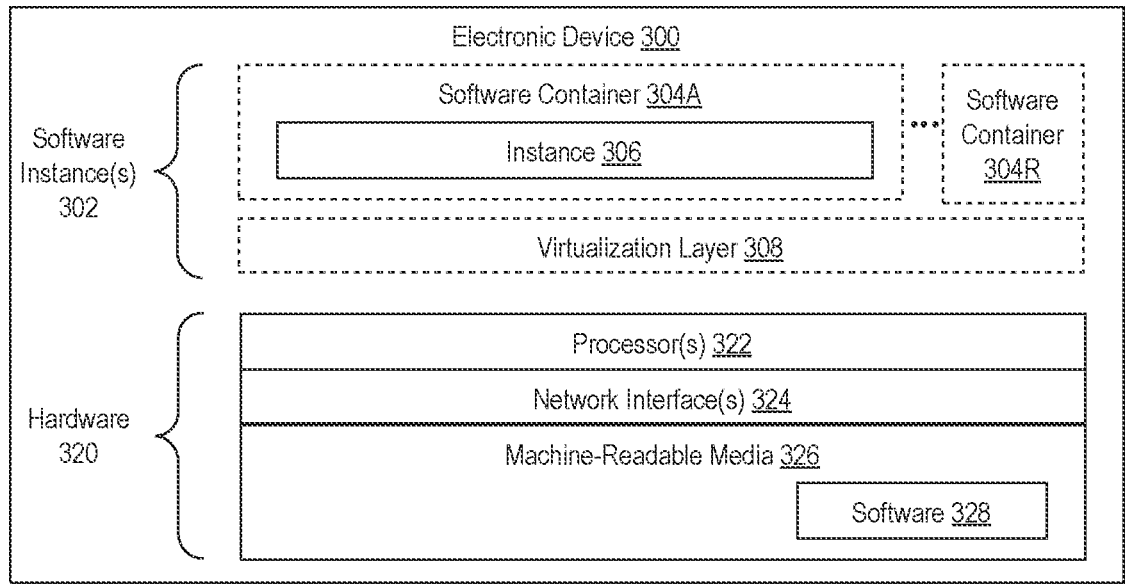
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and consolidated order manager may be implemented in one or more electronic devices 300.

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

Figure 3B:
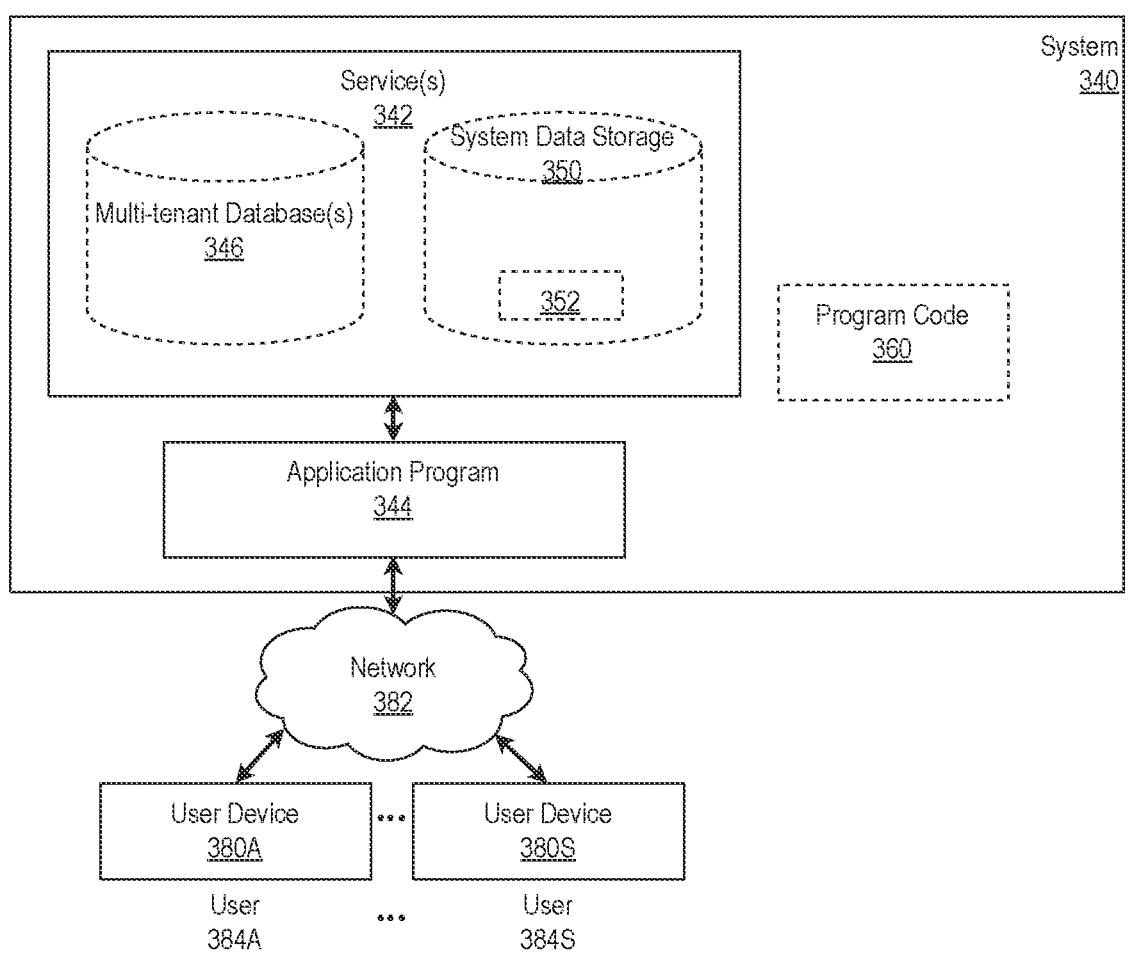
FIG. 3B is a block diagram of a deployment environment according to some example implementations.

FIG. 3B is a block diagram of a deployment environment according to some example implementations. A system 340 includes hardware (e.g., a set of one or more server devices) and software to provide service(s) 342, including a consolidated order manager. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method for improving the efficiency of an e-commerce hosting system having a machine learning model, to streamline and enhance user experience, comprising:
    retrieving a plurality of requests previously grouped into a user session, wherein:
        each request comprises a uniform resource locator (URL), a timestamp, a request method, a referrer, and a session identifier; and
        the user session comprises a session start time, a session end time, and a session length;
    generating preprocessed request information related to a plurality of conversion funnel metrics by:
        determining a request type for each of the plurality of requests;
        determining a relative time for each of the plurality of requests, the relative time being relative to the session length;
        determining, for each of the plurality of requests, a keyword count for each of a plurality of keywords, wherein:
            each of the plurality of keywords belongs to one or more keyword lists; and
            each keyword list corresponds to one of a plurality of conversion classifications; and
        determining a relative time distribution for each of the plurality of keywords, the relative time distribution being relative to the session length;
    applying the machine learning model to the plurality of requests and the preprocessed request information to tag each of the plurality of requests as being associated with one of the plurality of conversion classifications;
    creating a conversion funnel for the user session based on the preprocessed request information and the plurality of conversion funnel metrics, the conversion funnel comprising a plurality of conversion stages through a website; and
    determining whether the user session results in a purchase based upon the conversion funnel.

2. The computer-implemented method of claim 1, wherein the plurality of requests comprises requests made by a user to a website.

3. The computer-implemented method of claim 1, wherein each request type is one of a top-level page request or a child request.

4. The computer-implemented method of claim 1, wherein each relative time is one of early, middle, or late.

5. The computer-implemented method of claim 1, wherein each relative time distribution is one of early, middle, late, or uniform.

6. The computer-implemented method of claim 1, wherein the machine learning model comprises a decision tree or a random forest.

7. The computer-implemented method of claim 1, wherein the conversion funnel is created further based on a tag of each of the plurality of requests.

8. The computer-implemented method of claim 1, further comprising:
    retrieving a second plurality of requests previously grouped into a second user session;

generating second preprocessed request information by:
determining a request type for each of the second plurality of requests;
determining a relative time for each of the second plurality of requests;
determining, for each of the second plurality of requests, a keyword count for each of a second plurality of keywords; and
determining a relative time distribution for each of the second plurality of keywords; and
applying the machine learning model to the second plurality of requests and the second preprocessed request information to tag each of the second plurality of requests as being associated with one of the plurality of conversion classifications.

9. A non-transitory machine-readable storage medium that provides
instructions that, if executed by a processor, are configurable to cause the processor to perform operations for improving the efficiency of an e-commerce hosting system having a machine learning model, to streamline and enhance user experience, comprising:
retrieving a plurality of requests previously grouped into a user session, wherein:
each request comprises a uniform resource locator (URL), a timestamp, a request method, a referrer, and a session identifier; and
the user session comprises a session start time, a session end time, and a session length;
generating preprocessed request information related to a plurality of conversion funnel metrics by:
determining a request type for each of the plurality of requests;
determining a relative time for each of the plurality of requests, the relative time being relative to the session length;
determining, for each of the plurality of requests, a keyword count for each of a plurality of keywords, wherein:
each of the plurality of keywords belongs to one or more keyword lists; and
each keyword list corresponds to one of a plurality of conversion classifications; and
determining a relative time distribution for each of the plurality of keywords, the relative time distribution being relative to the session length;
applying the machine learning model to the plurality of requests and the preprocessed request information to tag each of the plurality of requests as being associated with one of the plurality of conversion classifications;
creating a conversion funnel for the user session based on the preprocessed request information and the plurality of conversion funnel metrics, the conversion funnel comprising a plurality of conversion stages through a website; and
determining whether the user session results in a purchase based upon the conversion funnel.

10. The non-transitory machine-readable storage medium of claim 9, wherein the plurality of requests comprises requests made by a user to a website.

11. The non-transitory machine-readable storage medium of claim 9, wherein each request type is one of a top-level page request or a child request.

12. The non-transitory machine-readable storage medium of claim 9, wherein each relative time is one of early, middle, or late.

13. The non-transitory machine-readable storage medium of claim 9, wherein each relative time distribution is one of early, middle, late, or uniform.

14. The non-transitory machine-readable storage medium of claim 9, wherein the machine learning model comprises a decision tree or a random forest.

15. The non-transitory machine-readable storage medium of claim 9, further comprising creating, for the plurality of requests, a conversion funnel based on a tag of each of the plurality of requests.

16. An apparatus for improving the efficiency of an e-commerce hosting system having a machine learning model, to streamline and enhance user experience, comprising:
a processor; and
a non-transitory machine-readable storage medium that provides instructions that, if executed by a processor, are configurable to cause the processor to perform operations
comprising:
retrieving a plurality of requests previously grouped into a user session, wherein:
each request comprises a uniform resource locator (URL), a timestamp, a request method, a referrer, and a session identifier; and
the user session comprises a session start time, a session end time, and a session length;
generating preprocessed request information related to a plurality of conversion funnel metrics by:
determining a request type for each of the plurality of requests;
determining a relative time for each of the plurality of requests, the relative time being relative to the session length;
determining, for each of the plurality of requests, a keyword count for each of a plurality of keywords, wherein:
each of the plurality of keywords belongs to one or more keyword lists; and
each keyword list corresponds to one of a plurality of conversion classifications; and
determining a relative time distribution for each of the plurality of keywords, the relative time distribution being relative to the session length;
applying the machine learning model to the plurality of requests and the preprocessed request information to tag each of the plurality of requests as being associated with one of the plurality of conversion classifications;
creating a conversion funnel for the user session based on the preprocessed request information and the plurality of conversion funnel metrics, the conversion funnel comprising a plurality of conversion stages through a website; and
determining whether the user session results in a purchase based upon the conversion funnel.

17. The apparatus of claim 16, wherein the plurality of requests comprises requests made by a user to a website.

18. The apparatus of claim 16, wherein each request type is one of a top-level page request or a child request.

19. The apparatus of claim 16, wherein the machine learning model comprises a decision tree or a random forest.

20. The apparatus of claim 16, wherein the operations further comprise creating, for the plurality of requests, a conversion funnel based on a tag of each of the plurality of requests.

* * * * *